United States Patent
Pape et al.

(10) Patent No.: US 11,900,118 B1
(45) Date of Patent: Feb. 13, 2024

(54) STACK POINTER INSTRUCTION BUFFER FOR ZERO-CYCLE LOADS

(71) Applicant: Apple Inc., Cupertino, CA (US)

(72) Inventors: John D. Pape, Cedar Park, TX (US); Francesco Spadini, Sunset Valley, TX (US); Zhaoxiang Jin, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/817,866

(22) Filed: Aug. 5, 2022

(51) Int. Cl.
*G06F 9/38* (2018.01)
*G06F 9/30* (2018.01)

(52) U.S. Cl.
CPC ........ *G06F 9/3814* (2013.01); *G06F 9/30134* (2013.01); *G06F 9/3826* (2013.01); *G06F 9/3838* (2013.01)

(58) Field of Classification Search
CPC .. G06F 9/3814; G06F 9/30134; G06F 9/3826; G06F 9/3838
See application file for complete search history.

(56) References Cited

U.S. PATENT DOCUMENTS

| | | |
|---|---|---|
| 9,996,348 B2 * | 6/2018 | Williams, III ........ G06F 9/3838 |
| 10,838,729 B1 | 11/2020 | Zlkl-Otoom et al. |
| 11,048,506 B2 | 6/2021 | Ramani et al. |
| 2021/0173654 A1 | 6/2021 | Duggal et al. |

* cited by examiner

*Primary Examiner* — Shawn Doman
(74) *Attorney, Agent, or Firm* — Kowert, Hood, Munyon, Rankin & Goetzel, P.C.; Scott W. Pape; Dean M. Munyon

(57) ABSTRACT

An apparatus includes a rescue buffer circuit, a store queue circuit, and a control circuit. The rescue buffer circuit may be configured to retain address information related to store instructions. The store queue circuit may be configured to buffer dependency information related to a particular store instruction until the particular store instruction is released to be executed. The control circuit may be configured to cause a subset of the dependency information for the particular store instruction to be written to the rescue buffer circuit. The rescue buffer circuit may be configured to retain the subset after the dependency information has been released from the store queue circuit, and to perform a subsequent load instruction corresponding to a memory location associated with the particular store instruction using the subset of the dependency information from the rescue buffer circuit.

20 Claims, 11 Drawing Sheets

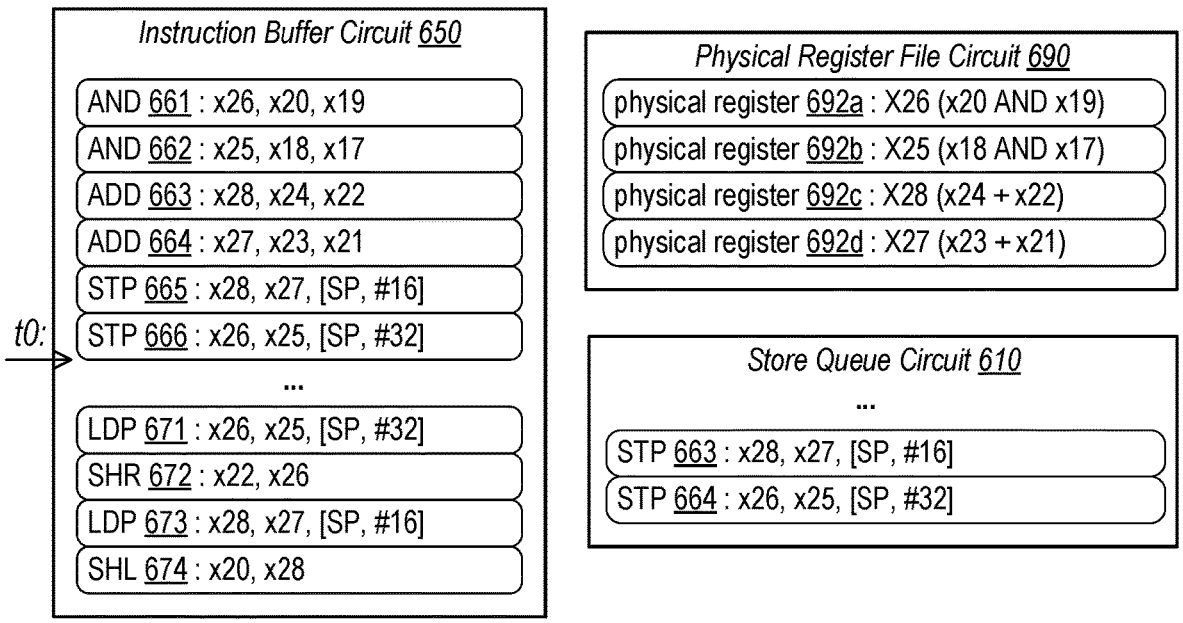
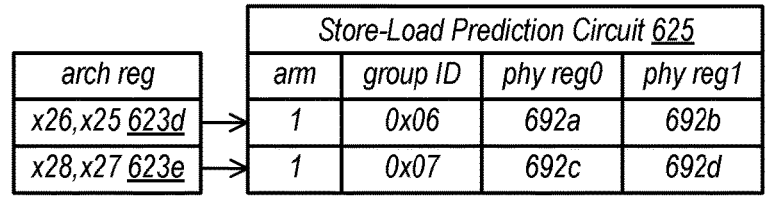
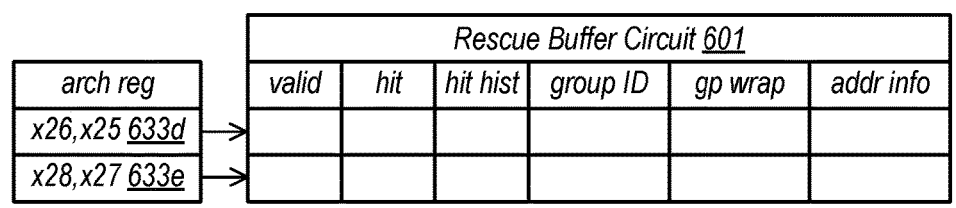
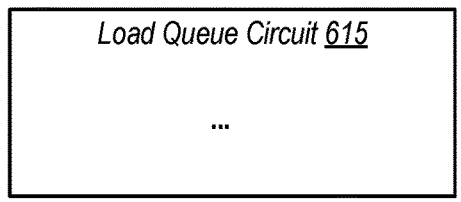
FIG. 6A

700

Buffering, into a store queue circuit, a particular store instruction and dependency information that is related to the particular store instruction.
710

Releasing, from the store queue circuit for execution, the particular store instruction and the related dependency information.
720

In response to the releasing, storing, in a rescue buffer circuit, a subset of the dependency information for the particular store instruction.
730

Identifying a subsequent load instruction that corresponds to a memory location associated with the particular store instruction.
740

After the particular store instruction is released, performing, using the dependency information from the rescue buffer circuit, the subsequent load instruction.
750

STACK POINTER INSTRUCTION BUFFER FOR ZERO-CYCLE LOADS

BACKGROUND

Technical Field

Embodiments described herein are related to computing systems, including systems-on-a-chip (SoCs). More particularly, embodiments are disclosed to techniques for enabling zero-cycle loads in a processor circuit.

Description of the Related Art

Storing and loading information to and from memory circuits is a common occurrence for processor cores. Store instructions are used to write information to a memory circuit for potential use at a later time. Load instructions are used to retrieve previously written information form the memory circuit. A processor core may take multiple processor cycles to complete a store instruction. For example, a store to a dynamic random-access memory (DRAM) that is external to the processor core may require tens of cycles or more as performing the store may include use of a memory controller circuit that is separate from the processor core. Cache circuits may be used to reduce a time to access information in such cases, but even storing information to a local cache circuit may consume several processor cycles. Reading this stored information may further consume several cycles or more depending if the desired information is in a local cache or must be read from DRAM.

Due to the time consumed writing and reading information, a processor core may use store and load instruction queues. These queues may allow for a plurality of store and load instructions to be decoded and ready to perform as core resources permit. For example, after completion of a given store instruction, a next store instruction in the store queue may be performed. Depending on a current workload of the processor core, store instructions may remain in a store instruction queue for tens, hundreds or more, processor cycles. The processor core may continue to execute instructions fetched after queued store instructions. A subsequent load instruction may access information that is to be written by a queued store instruction. In some cases, this may result in a stall of further program execution until the store instruction proceeds through the queue and is eventually performed. After the store instruction has written the information to the memory circuit (e.g., DRAM, cache, or similar), the paired load instruction may then be performed, reading the information that has been written.

BRIEF DESCRIPTION OF THE DRAWINGS

The following detailed description makes reference to the accompanying drawings, which are now briefly described.

FIGS. 6A, 6B, and 6C depict a flow of information through a store-load prediction circuit and rescue buffer circuit at three points in time.

FIG. 7 illustrates a flow diagram of an embodiment of a method for operating a rescue buffer circuit.

Figure 1:
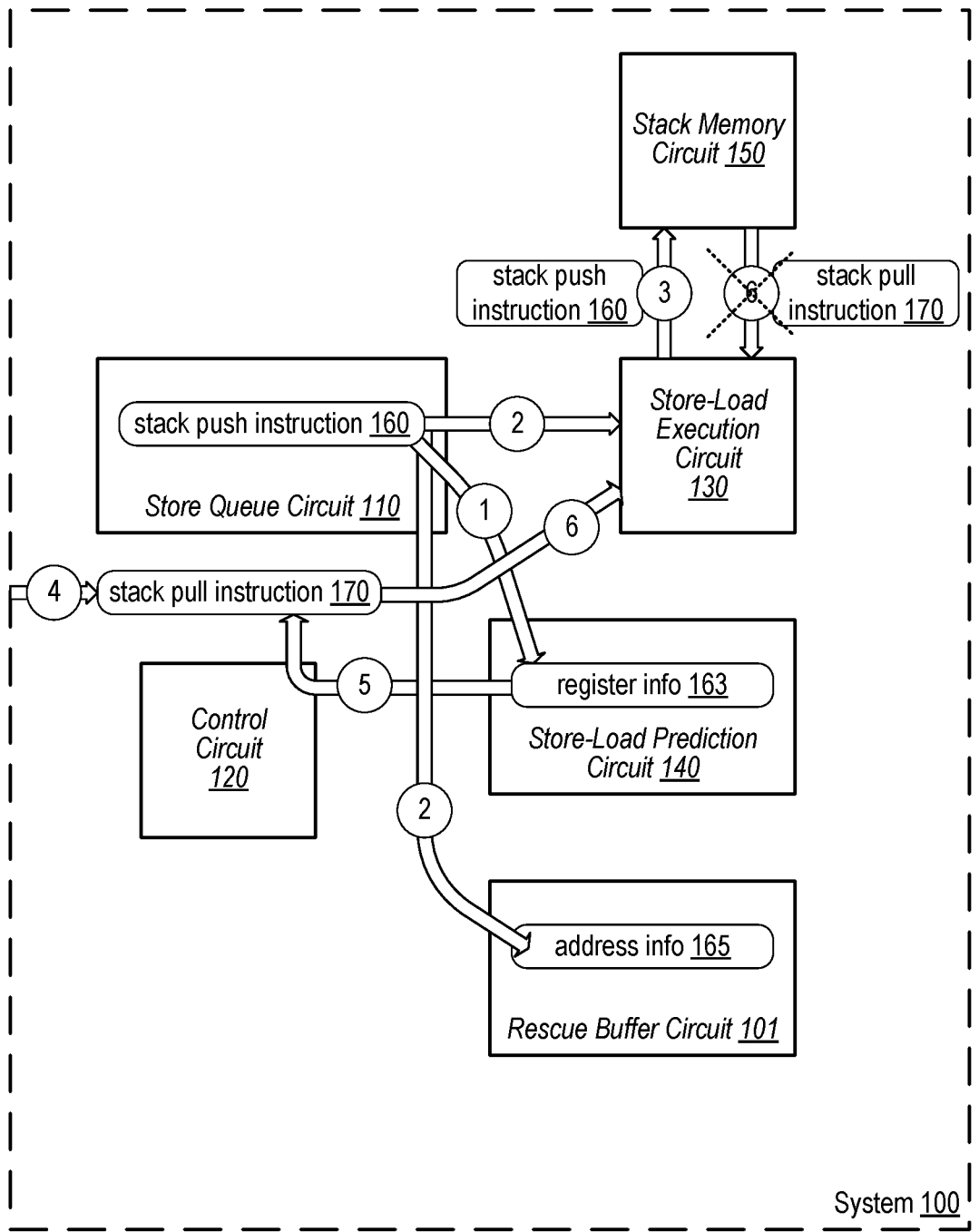
FIG. 1 illustrates a block diagram of an embodiment of a system that includes a rescue buffer circuit.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims.

DETAILED DESCRIPTION OF EMBODIMENTS

One technique for increasing performance of a CPU is zero-cycle loads (ZCL). ZCLs provide a short cut for performing a load instruction. Certain types of store-load instruction pairs may be identified in the instruction code. For example, a given store instruction may identify a particular architectural register that holds a destination address to which data is to be written. A subsequent load instruction may use the same architectural register to indicate a source address from which to read information. If the processor core can determine that the value held in the architectural register does not change between the store and load instructions, then these load and store instructions may be identified as a store-load pair.

A "store-load pair" refers to a load instruction that reads information from a particular memory address to which the paired store instruction wrote the information. If the paired load instruction is ready to launch while the store instruction remains in the store instruction queue, then a zero-cycle load may be performed by using relevant information from the queued store instruction. This relevant information may be retrieved from the store instruction queue and used to speculatively fulfill the paired load instruction without waiting for the paired store instruction to be performed.

If, however, the paired load instruction is not ready to launch until after the store instruction has been released from the store instruction queue, then a zero-cycle load may not be performed. Accordingly, the present disclosure contemplates a technique for retaining the relevant information after store instruction has been released. By retaining this relevant information, an amount of time for identifying a paired load instruction may be extended. The disclosed technique describes use of a rescue buffer circuit to increase a number of instances in which a ZCL operation may be performed.

Since this ZCL technique utilizes a rescue buffer circuit to retain relevant information of a store instruction until a paired load instruction is ready to launch, a distance between the store instruction and the subsequent load instruction may be limited to a particular number of instructions. As used herein, a "distance" between instructions refers to a number of instructions fetched between a store instruction and a paired load instruction. In some cases, the distance may be far, for example, hundreds or thousands or more instructions being fetched in between the store and load instructions. In other cases, this distance may be short, e.g., tens or even fewer instructions between the pair. A large distance between a store-load pair may result in a different instruction modifying the information stored at the memory address, thereby making a link between the store and load instructions irrelevant and preventing effective use of ZCL techniques. If, however, this distance satisfies a determined threshold distance, then a link between a pair of load and store instructions may be identified and ZCL techniques may be used for the store-load pair.

One particular type of ZCL technique that may be employed is a zero-cycle load for stack pointer pushes and pops (ZCL-SP). Stack pushes may frequently be followed by a stack pop within a satisfactory distance, allowing a pairing to be made between the store instruction associated with the stack push and the load instruction associated with the stack pop. Accordingly, stack pushes and pops may be good candidates for establishing store-load pairs as a stack pop may occur shortly after a stack push. Stack pushes and stack pops may be commonly used at a beginning (push) and end (pop) of a function call. Short functions may satisfy a distance threshold, enabling use of the ZCL-SP technique. Longer functions, however, may result in the store instructions related to the stack pushes being performed before the paired load instructions related to the stack pops are ready to launch. The store information is cleared from the store instruction queue before this information may be retrieved for use as a ZCL for the paired load instruction. In such an example, the load instruction is performed by accessing the memory circuits, and therefore using a plurality of processor cycles to be performed.

As function calls, as well as other uses of stack pointer pushes and pops, may be frequently utilized in some program code, there is a desire to increase a number of cases in which a ZCL-SP technique may be utilized. The present disclosure considers novel digital circuits for use in processor core that retain the store information in a buffer circuit after store instruction has been launched from the store instruction queue. For example, a processor circuit may include a rescue buffer circuit and a control circuit that is configured to cause dependency information relating to a particular store instruction to be written to the rescue buffer circuit. The rescue buffer circuit may be configured to retain this dependency information after the particular store instruction has been released from the store queue circuit. The control circuit may be further configured to perform a subsequent load instruction corresponding to a memory location associated with the particular store instruction using the dependency information from the rescue buffer circuit.

Use of a rescue buffer circuit may increase an efficiency of store-load execution circuit included in a processor core. Such efficiency increases may increase a bandwidth and lower power consumption of the processor core. Programs may, therefore, be executed with increased efficiency, thereby improving system performance observed by a user and/or increasing a number of programs that may executed concurrently.

FIG. 1 illustrates a block diagram of an embodiment of a system that includes a rescue buffer circuit to retain information of store instructions. As illustrated, system 100 depicts a system in which the rescue buffer circuit is used to retain information of a store instruction after the store instruction is released from a store queue circuit for execution. This retained information may be used to implement a zero-cycle load (ZCL) operation that reduces a memory fetch time and thereby increases performance of system 100. System 100 includes rescue buffer circuit 101, store queue circuit 110, control circuit 120, store-load execution circuit 130, store-load prediction circuit 140, and stack memory circuit 150. In some embodiments, system 100 may be a processor circuit within an integrated circuit with all illustrated elements included on a single chip. In other embodiments, system 100 may be a part of a computing system with elements implemented across multiple chips. For example, stack memory circuit 150 may be allocated within one or more dynamic read-only memory (DRAM) chips and coupled to store-load execution circuit 130 via one or more interfaces, memory controllers, and the like. System 100 may be included in any suitable computing system such as a desktop or laptop computer, a smartphone, a tablet computer, a wearable smart device, or the like.

System 100, as shown, includes store-load execution circuit 130 that is configured to execute stack push and stack pop instructions using stack memory circuit 150. As used herein, a "stack push" corresponds to a particular type of store instruction that writes information indicated by the instruction to a next location in stack memory circuit 150. Similarly, a "stack pop" is a particular type of load instruction that reads information from a top location in stack memory circuit 150. Stack memory circuit 150 may be implemented using any suitable type of memory circuit. In some embodiments, stack memory circuit 150 corresponds to an allocated space within a larger system memory such as a system DRAM device or devices.

Store-load execution circuit 130 is configured to receive store instructions, including stack push instruction 160, from store queue circuit 110. Store queue circuit 110 is configured to buffer store instructions, including stack push instruction 160, until a given store instruction is released in response to selection by store-load execution circuit 130. Store-load execution circuit 130 performs store instructions received from store queue circuit 110 as well as load instructions (e.g., stack pop instruction 170), and after completion of the store or load instruction, may retire the instruction if it was completed successfully. Since store-load execution circuit 130 executes various types of memory instructions, executions times for completing the memory instructions may be longer than other types of instructions performed in system 100. In order to allow progress to be made for such other instructions, memory instructions for store-load execution circuit 130 may be buffered, thereby allowing other instructions that are not dependent on buffered memory instructions to progress.

As shown, system 100 includes store queue circuit 110 that, as stated, is configured to buffer various types of store instructions until store-load execution circuit has bandwidth available to perform a next store instructions in store queue circuit 110. Although, not shown, system 100 may, in some embodiments, include a separate load queue circuit configured to buffer various load instructions until store-load execution circuit 130 is has available bandwidth. Accordingly, a given program may include a load instruction that follows, some number of instructions later, a store instruction that targets a same memory location. In such cases, a value being written by the store instruction may correspond to a value being read by the load instruction.

System 100, as illustrated, includes store-load prediction circuit 140 that is configured to retain register information (e.g., register info 163) that is related to stack push instructions (e.g., stack push instruction 160). This register information 163 includes details related to stack push instruction 160, such as an identification value that identifies stack push instruction 160 as well as information indicating which one (or ones) of a local set of physical registers has been allocated to stack push instruction 160. The identification value for stack push instruction 160 may be related to a respective entry in store queue circuit 110.

Rescue buffer circuit 101, as shown, is configured to retain address information related to store instructions, including address information (info) 165 corresponding to stack push instruction 160. Rescue buffer circuit 101 is further configured to retain this address information after the related store instruction has been released for execution by store-load execution circuit 130. For example, when stack push instruction 160 is released for execution to store-load execution circuit 130, register information 163 store-load prediction circuit 140 may no longer be traceable to stack push instruction 160. Retaining address information 165 in rescue buffer circuit 101 may preserve information that allows register information 163 to be traceable to stack push instruction 160, thereby extending an amount of time during which register information 163 remains useful.

As illustrated, control circuit 120 includes logic circuitry for managing entries in store-load prediction circuit 140 and rescue buffer circuit 101. For example, control circuit 120 is configured to cause register information 163 related to stack push instruction 160 to be written to store-load prediction circuit 140, and to cause address information 165 related to stack push instruction 160 to be written to rescue buffer circuit 101. In some embodiments, register information 163 may be stored in store-load prediction circuit 140 in response to stack push instruction 160 being placed in store queue circuit 110. In response to a determination that stack push instruction 160 is being released from store queue circuit 110, control circuit 120 is configured to cause address information 165 to be written to rescue buffer circuit 101. Rescue buffer circuit 101 and store-load prediction circuit 140 may each have a capacity to store address information for any suitable number of store instructions. In some embodiments, for example, a number of entries in rescue buffer circuit 101 may be less than, or equal to, a number of entries in store-load prediction circuit 140. Additional details regarding structure of rescue buffer and store-load prediction circuits are disclosed below in regards to FIGS. 5-6.

As described above, rescue buffer circuit 101 is configured to retain address information 165 after stack push instruction 160 has been released from store queue circuit 110. Control circuit 120 is configured to identify, using address information 165 in rescue buffer circuit 101, a subsequent stack pop instruction 170 that is related to stack push instruction 160. Address information 165 may include a variety of information related to stack push instruction 160, including, for example, an indication of a destination address for stack push instruction 160. Accordingly, stack pop instruction 170 may be linked to stack push instruction 160 based on stack pop instruction 170 having a source address that corresponds to the destination address of stack push instruction 160.

In some embodiments, address information 165 may also include one or more values indicative of a validity of information in the respective rescue buffer circuit 101. For example, if a different stack pop instruction followed by a different stack push instruction were to be performed prior to stack pop instruction 170, then the information associated with stack push instruction 160 in rescue buffer circuit 101 may be invalid. In some embodiments, execution of the different stack push instruction may result in a different entry in rescue buffer circuit 101 being created, or may result in the same entry as used for stack push instruction 160 being updated to correspond to the different stack push instruction.

After stack pop instruction 170 has been associated with stack push instruction 160, control circuit 120 may be capable of performing stack pop instruction 170 using register information 163 from store-load prediction circuit 140. Using register information 163 may include reassigning a physical register that was allocated to stack push instruction 160 to stack pop instruction 170. The physical register allocated to stack push instruction 160 may store the information to be written by stack push instruction 160. Accordingly, by allocating this same physical register to stack pop instruction 170, the valid information may be retrieved without having to perform a memory request to any cache memory or system memory used in a memory hierarchy of system 100. Avoiding such memory requests may reduce a workload for memory controllers in the memory hierarchy and increase performance of system 100. Accordingly, identifying such associations between stack push and stack pop instructions may be highly desired in some systems.

As shown, retaining address information 165 after stack push instruction 160 has been released, may extend an amount of time for identifying stack pop instruction 170 using register information 163 in store-load prediction circuit 140. Without rescue buffer circuit 101, the releasing of stack push instruction 160 may end an ability of associating stack pop instruction 170 to stack push instruction 160. Accordingly, use of rescue buffer circuit 101 may increase a number of instances in which a ZCL operation may be performed.

It is noted that system 100, as illustrated in FIG. 1, is merely an example. System 100 has been simplified to highlight features relevant to this disclosure. Elements not used to describe the details of the disclosed concepts have been omitted. For example, some (or all) of the illustrated elements may be included in a processor circuit. Processor circuits may include various additional circuits that are not illustrated, such as additional execution circuits, an instruction decode circuit, branch prediction circuits, a load queue circuit, and the like. In various embodiments, the illustrated circuit elements may be implemented using any suitable combination of sequential and combinatorial logic circuits. In addition, physical register and/or memory circuits, such as static random-access memory (SRAM) circuits may be used in these circuits to temporarily hold information such as instructions, fetch parameters, and/or address values.

In the description of FIG. 1, an example of using a rescue buffer circuit to perform a ZCL operation between stack push and stack pop instructions is shown. Such ZCL operations may be utilized in a variety of processor cores. Another example of a processor core utilizing a rescue buffer circuit is depicted in FIG. 2.

Figure 2:
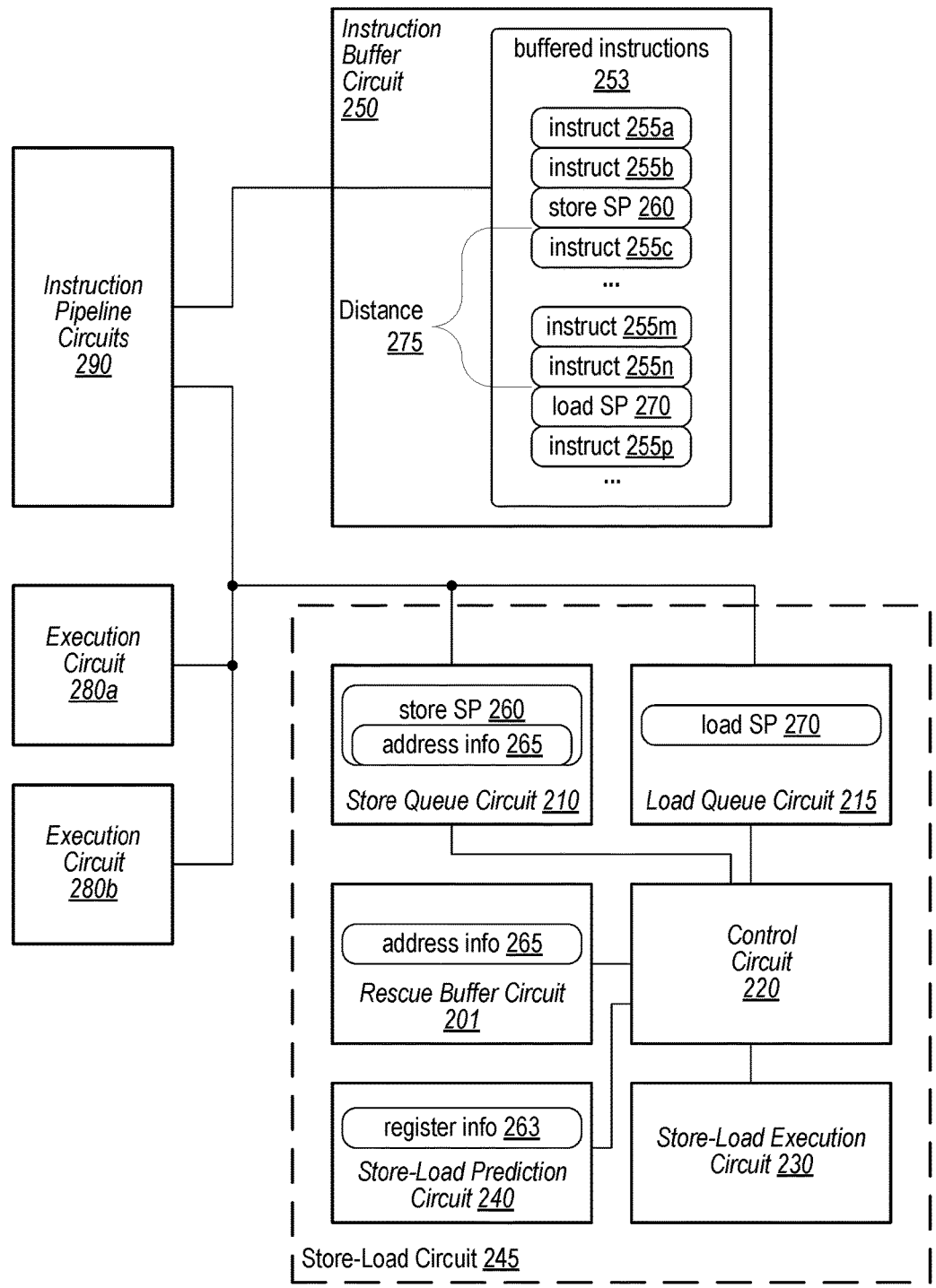
FIG. 2 shows a block diagram of an embodiment of a processor core with a rescue buffer circuit used to process stack push and pop instructions.

Moving to FIG. 2, a block diagram of an embodiment of a processor core implementing a ZCL technique on a pair of stack instructions is shown. Processor core 200 includes instruction buffer circuit 250, store-load circuit 245, execution circuits 280a and 280b (collectively 280), and instruction pipeline circuits 290. Eight buffered instructions 253 are shown in instruction buffer circuit 250, including store stack pointer (SP) instruction 260 and load stack pointer (SP) instruction 270. Store-load circuit 245 includes various circuits, including store queue circuit 210, load queue circuit 215, rescue buffer circuit 201, control circuit 220, store-load prediction circuit 240, and store-load execution circuit 230. In a similar manner as system 100 above, processor core 200 may be implemented using a suitable combination of sequential logic, combinational logic, and memory circuits in a single integrated circuit (e.g., a system-on-chip).

As shown, instruction pipeline circuits 290 include various circuits used to fetch, decode, and schedule instructions for execution by one or more of execution circuits 280 and store-load circuit 245. For example, Boolean and integer instructions may be executed by execution circuit 280a while floating-point instructions are executed by execution circuit 280b. Operands for some instructions may be retrieved from a memory hierarchy using read instructions executed by store-load circuit 245. Results of some instructions may be written to the memory hierarchy using store instructions executed by store-load circuit 245. Instruction buffer circuit 250 stores buffered instructions 253 that have been fetched, decoded, and scheduled by instruction pipeline circuits 290 and are, therefore, ready for execution when the corresponding execution circuit has bandwidth to perform the instruction.

Store SP instruction 260 may be a form of stack push instruction (e.g., stack push instruction 160) that stores a value held in an indicated architectural register to a next open location indicated by a stack pointer (not shown) in processor core 200. Similarly, load SP instruction is a form of stack pop instruction (e.g., stack pop instruction 170) that reads a value from a next open location indicated by the stack pointer and writes the read value to a corresponding architectural register. The number of instructions scheduled between store SP instruction 260 and load SP instruction 270 is referred to as the "distance." As shown, load SP instruction 270 is separated from store SP instruction 260 by distance 275.

As described above, a value may be written to memory by a store instruction only to be read some number of instructions later by a load instruction. The store and load instructions in such a case forming a store-load pair. In the present example, store SP instruction 260 and load SP instruction 270 write to and read from, respectively, a same position in the stack memory circuit (e.g., stack memory circuit 150 in FIG. 1) and, therefore, form a store-load pair. Store-load circuit 245 is configured to identify this store-load pair and, if conditions are met, may perform load SP instruction 270 using ZCL techniques.

Similar to rescue buffer circuit 101 of FIG. 1, rescue buffer circuit 201 is configured to retain address information related to store instructions. Store queue circuit 210 is configured to buffer dependency information related to store SP instruction 260 until store SP instruction 260 is released to be executed. As shown, store queue circuit 210 holds store SP instruction 260 which includes address information (info) 265. In this example, address information 265 may be utilized as the dependency information. Address information 265, for example, may indicate an intermediate or final destination location where a value indicated by the instruction is to be stored.

As illustrated, control circuit 220 is configured to cause a subset of the dependency information for store SP instruction 260 (e.g., address information 265) to be written to rescue buffer circuit 201. In some embodiments, control circuit 220 is further configured to cause address information 265 to be written to rescue buffer circuit 201 in response to a determination that store SP instruction 260 is being released from store queue circuit 210. As described above, an entry in rescue buffer circuit 201 may be used to extend an amount of time to identify a potential load instruction to pair with store SP instruction 260 after an indication that store-load execution circuit 230 is going to retrieve store SP instruction 260 from store queue circuit 210. Rescue buffer circuit 201 is configured to retain address information 265 after address information 265 has been released from store queue circuit 210 with the retrieval of store SP instruction 260.

In some embodiments, control circuit 220 is configured to determine that store SP instruction 260 satisfies a set of requirements for use in rescue buffer circuit 201 in order to cause address information 265 to be written to rescue buffer circuit 201. For example, one requirement of the set of requirements may be that store SP instruction 260 is a particular type of instruction, such as a store to a stack memory. Rescue buffer circuit 201 may be reserved for use with particular types of store instructions. A typical usage of stack store and load instructions is to stack certain values prior to transferring program flow to a subroutine and then unstack the values in response to a return from the subroutine. Such usage may be commonly implemented in program code to protect desired values during the execution of the subroutine. This usage may also result in one or more opportunities to utilize ZCL techniques. Use of rescue buffer circuit 201 may increase the number of these opportunities.

As illustrated, control circuit 220 may perform a subsequent load instruction (e.g., load SP instruction 270) corresponding to a memory location associated with the particular store instruction using the subset of the dependency information from rescue buffer circuit 201. For example, control circuit 220 is further configured to determine that load SP instruction 270 is a load from the stack memory in order to use address information 265 from rescue buffer circuit 201. Control circuit 220 may use address information 265 to identify load SP instruction 270 as a potential pairing to store SP instruction 260. A source address included in load SP instruction 270 may be determined to correspond to address information 265 which represents a destination address for store SP instruction 260. If load SP instruction 270 is reading from the same location that store SP instruction 260 is writing, then these two instruction can be paired and a ZCL operation can be utilized such that a physical register allocated to an architectural register indicated by store SP instruction 260 to hold the value to be written is reallocated to load SP instruction 270 without store-load execution circuit having to issue a memory request to a memory hierarchy outside of processor core 200. Register information (info) 263 held in store-load prediction circuit 240 may be used to identify the physical register that was allocated to store SP instruction 260. Use of such a ZCL operation may require no execution cycles to complete since the load is fulfilled by reallocating a physical register that already holds the value that was to be read.

In some embodiments, control circuit 220 is further configured to determine that load SP instruction 270 is separated from store SP instruction 260 by less than a threshold number of instructions in order to use register information 263 from store-load prediction circuit 240. Control circuit 220 determines whether distance 275 satisfies a threshold distance for use of rescue buffer circuit 201. For example, simulated use of rescue buffer circuit 201 or empirical data observed from actual use of a processor with rescue buffer circuits may provide an indication of a particular distance at which use of rescue buffer circuits becomes problematic. The larger the distance between the store and load instructions, the greater the chance that the value stored by the store instruction is not the actual value in the final destination location by the time the paired load instruction is ready to be executed. In a multicore processor, for instance, a different core may store a value to the same destination as the store instruction of the store-load pair. If the different core stores a value after the store instruction of the store-load pair but before the paired load instruction, then the value that may be held in a physical register that was allocated to the store instruction may not be the current value of the destination location. Accordingly, use of the ZCL operation in such a case would result in a wrong value being used for the load instruction. Circuit designers may, therefore, implement a threshold distance for use of a rescue buffer based on a determination of a suitable threshold.

It is noted that the embodiment of FIG. 2 is one depiction of a ZCL operation using a rescue buffer circuit. Other embodiments, may include a different combination of circuit elements, including additional circuits. In some embodiments, for example, additional circuits may include one or more cache circuits, memory controllers, and the like.

In the discussion of FIG. 2, it is noted that rescue buffer circuit 201 may be used when a particular store instruction is determined to satisfy one or more requirements. As an example of such a requirement, a store instruction corresponding to a store to a stack memory is disclosed. Another example of a particular requirement for using a rescue buffer circuit is shown in FIG. 3.

Figure 3:
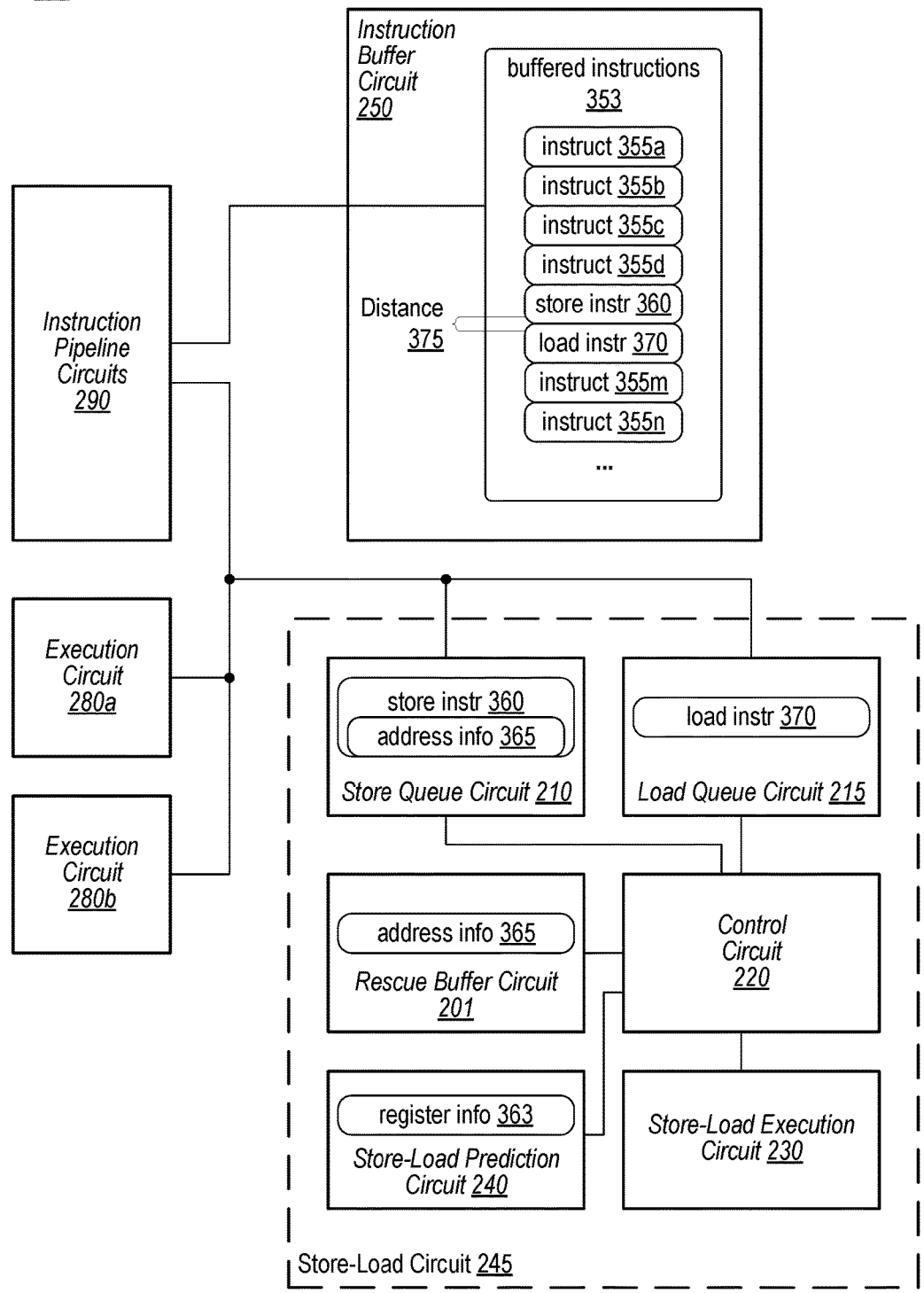
FIG. 3 depicts a block diagram of an embodiment of the processor core of FIG. 2 with a rescue buffer circuit used to process adjacent store and load instructions.

Turning to FIG. 3, another embodiment of the block diagram of processor core 200 is depicted. In FIG. 3, instruction buffer circuit 250 is shown holding eight buffered instructions 353. Buffered instructions 353 include store instruction (instr) 360 and load instruction (instr) 370 that are a distance 375 apart.

As disclosed above, control circuit 220 may be configured to determine that a particular store instruction satisfies one or more of a set of requirements for use in rescue buffer circuit 201 in order to cause address information to be written to rescue buffer circuit 201. In regards to FIG. 2, an example of a requirement of the set of requirements was that the particular store instruction is a particular type of instruction, such as a store to a stack memory.

As illustrated, another requirement of the set of requirements may be that the particular store instruction is adjacent to the subsequent load instruction. Within buffered instructions 353, store instruction 360 has a distance 375 to load instruction 370 of zero, as load instruction 370 is adjacent to store instruction 360. In some embodiments, if store instruction 360 and load instruction 370 are adjacent, then a type of store instruction 360 may not be relevant.

Control circuit 220, as illustrated, stores register information 363 into an entry in store-load prediction circuit 240 in response to store instruction 360 being placed into store queue circuit 210. Register information 363 may indicate, e.g., a physical register allocated to an architectural register indicated by store instruction 360 for holding a value to be written to a memory location indicated by address information (info) 365. Control circuit 220 may be further configured, in response to a determination that store instruction 360 is being released from store queue circuit 210, to cause dependency information (e.g., address information 365) to be written to rescue buffer circuit 201.

Although store instruction 360 and load instruction 370 are adjacent, store instruction 360 is placed into store queue circuit 210 while load instruction 370 is placed in load queue circuit 215 prior to being executed. In some cases, store queue circuit 210 may have few or no store instructions ahead of store instruction 360, thereby allowing store instruction 360 to be released for execution with little to no delay. In contrast, load queue circuit 215 may have one or more load instructions in queue ahead of load instruction 370, thereby causing a delay before load queue circuit 215 releases load instruction 370 for execution. Accordingly, store instruction 360 may be released from store queue circuit 210 before load instruction 370 is released from load queue circuit 215.

Use of rescue buffer circuit 201 to retain register information 363 until load instruction 370 is ready to be executed may enable use of a ZCL operation to complete load instruction 370. Address information 365 in rescue buffer circuit 201 may be used to identify the corresponding register information 363 in store-load prediction circuit 240. When load instruction 370 is ready to be executed, the identified register information 363 may be used to reallocate the physical register holding the value to be written to the memory location indicated by address information 365, thereby eliminating a need for store-load execution circuit 230 to issue a memory request to a memory hierarchy to retrieve a value for fulfilling load instruction 370. Time and resources may be saved, thereby increasing a performance and reducing a power consumption of processor core 200.

It is noted that the embodiments of FIGS. 2 and 3 provide examples of two types of requirements for using a rescue buffer circuit. For example, a requirement of a load instruction being adjacent (e.g., a distance of zero) to a store instruction is shown. In other embodiments, such a requirement may allow for a distance greater than zero with use of the rescue buffer circuit. For example, the requirement may be that a store-load pair are included in a same instruction fetch group.

Descriptions of FIGS. 1-3 disclose use of architectural and physical registers, and a memory hierarchy for performing a ZCL operation. An embodiment of a system that includes a system memory hierarchy and a physical register file circuit is shown in FIG. 4.

Figure 4:
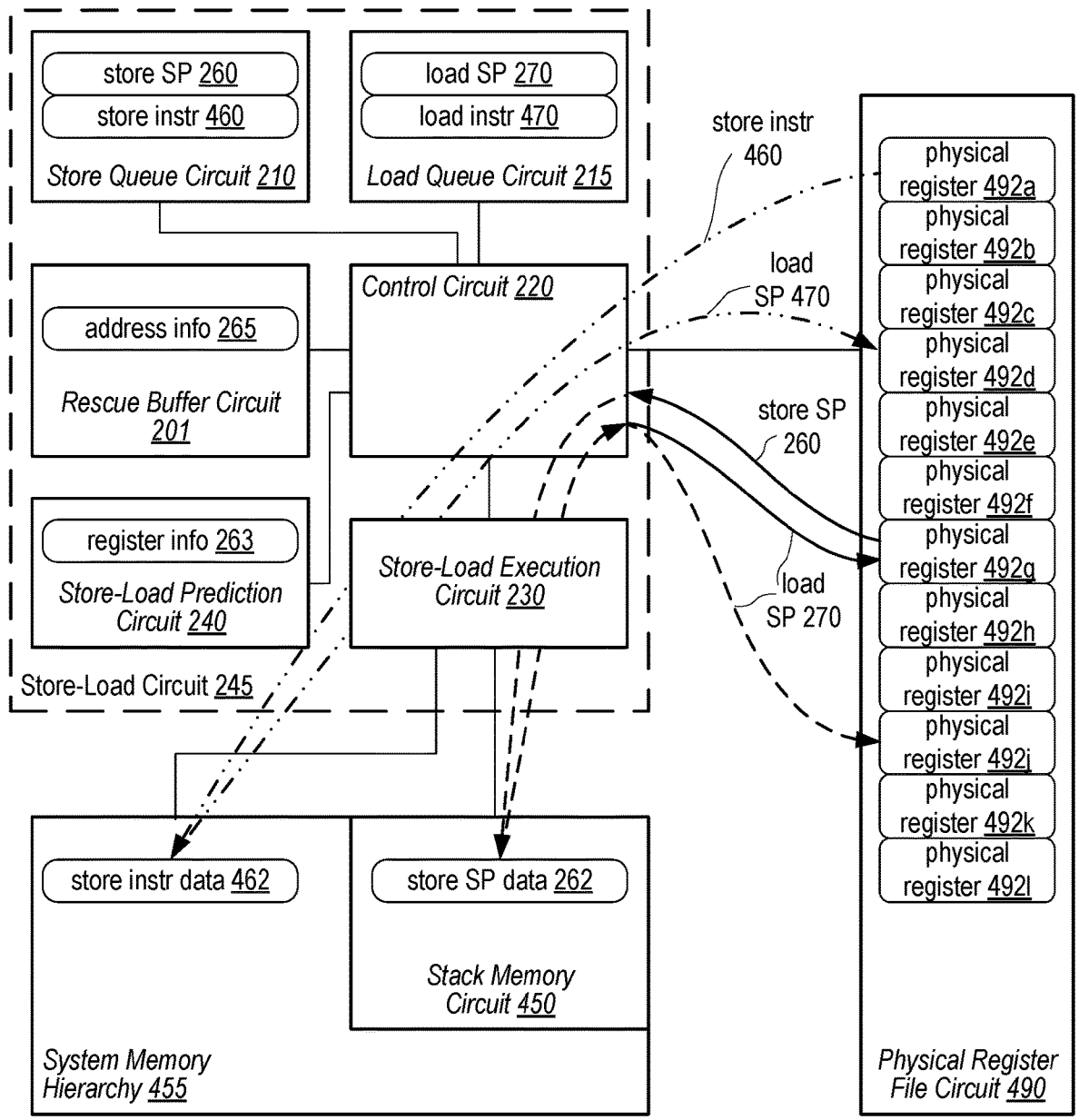
FIG. 4 illustrates a block diagram of an embodiment of a system that includes a rescue buffer circuit as well as a physical register file circuit and a system memory hierarchy.

Proceeding to FIG. 4, a block diagram of another embodiment of a system that includes a rescue buffer circuit configured to retain information of store instructions is illustrated. As shown, system 400 includes store-load circuit 245, system memory hierarchy 455 (including stack memory circuit 450), and physical register file circuit 490. As shown in FIGS. 2 and 3, store-load circuit 245 includes rescue buffer circuit 201, store queue circuit 210, load queue circuit 215, control circuit 220, store-load execution circuit 230, and store-load prediction circuit 240. Physical register file circuit 490 includes physical registers 492a-4921 (collectively physical registers 492).

As shown, FIG. 4 depicts two different store-load pairs. Store SP instruction 260 is a store instruction to a location in stack memory circuit 450 and is paired with load SP instruction 270 that is a load instruction from the same location in stack memory circuit 450. Store instruction 460 is a store instruction to a location in system memory hierarchy 455 and is paired with load instruction 470 that is a load instruction from the same memory location. In this example, rescue buffer circuit 201 is used to enable a ZCL operation to complete load SP instruction 270 while load instruction 470 is performed using a memory request to system memory hierarchy 455.

System memory hierarchy may include any suitable number of memory circuits for reading and writing information used in the operation of system 400, including, for example, a combination of volatile and non-volatile memory circuits. Store-load execution circuit 230 may, in some embodiments, issue memory requests via a memory controller circuit (not shown) for reading and writing information from/to system memory hierarchy 455.

System 400, as illustrated, uses a plurality of physical registers including physical registers 492, to hold values for instructions being performed. The instructions may indicate one or more architectural registers to use as operands. Circuits within system 400 (e.g., a decode circuit) allocate a particular one of physical registers 492 to a respective architectural register indicated by an instruction being decoded. This allocation may remain valid until no subsequent instructions (e.g., other instructions held in instruction buffer circuit 250) indicate the same architectural register.

As shown, store instruction 460 is not eligible to use rescue buffer circuit 201 due to a failure to meet one or more requirements. Store instruction 460 identifies an architectural register that has been allocated to physical register 492*a* holding the information that is to be written to system memory hierarchy 455, e.g., store instruction data 462. Accordingly, physical register 492*a* is allocated to store instruction 460. Store instruction 460 is performed by store-load execution circuit 230, resulting in store instruction data 462 being read from physical register 492*a* and written to a particular location in system memory hierarchy 455. After store instruction data 462 has been written to system memory hierarchy 455, store instruction 460 may be retired and physical register 492*a* deallocated.

As shown, load instruction 470 is released from load queue circuit 215 to be performed after store instruction 460 has been performed. Since physical register 492*a* has been deallocated from store instruction 460, use of a ZCL operation to perform load instruction 470 may not be possible. Accordingly, store-load execution circuit 230 issues a memory request to system memory hierarchy 455 to retrieve store instruction data 462 from system memory hierarchy 455. Load instruction 470 is allocated physical register 492*d* to hold the retrieved information. Physical register 492*d* will be allocated to a next instruction that identifies the result of load instruction 470 as an operand.

Store SP instruction 260, as illustrated, satisfies at least one requirement for use of rescue buffer circuit 201, including, for example, that store SP instruction 260 is a store instruction to stack memory circuit 450. Store SP instruction 260 identifies data in an architectural register allocated to physical register 492*g* as store SP data 262 to be written to stack memory circuit 450. Register information 263 is stored in store-load prediction circuit 240 to be used in a future ZCL operation if a paired load instruction (e.g., load SP instruction 270) meets further requirements. In response to store SP instruction 260 being released from store queue circuit 210 before paired load SP instruction 270 is ready for execution, address information 265 is placed in an entry in rescue buffer circuit 201.

As shown, load SP instruction 270 is allocated physical register 492*j* to hold information retrieved as a result of performing load SP instruction 270. When load SP instruction 270 is ready to be released for execution from load queue circuit 215, control circuit 220 is configured to determine whether load SP instruction 270 satisfies one or more conditions for using rescue buffer circuit 201. For example, one condition may require load SP instruction 270 to be within a predetermined distance from the paired store SP instruction 260. In response to satisfying such conditions, control circuit 220 is further configured to determine, using address information 265, that load SP instruction 270 is paired to store SP instruction 260. Control circuit 220 is further configured to reassign, using register information 263, physical register 492*g* that was allocated to store SP instruction 260 (and that retains store SP data 262) to load SP instruction 270. Physical register 492*h* is deallocated from load SP instruction 270 as a result of the reallocation of physical register 492*g*. In some embodiments, physical register 492*g* may be reallocated to a consumer instruction that uses information from load SP instruction 270.

Accordingly, by using rescue buffer circuit 201, a memory request to retrieve store SP data 262 from stack memory circuit 450 may be avoided. Load SP 270 is completed without an additional transfer of store SP data 262 since the information was already held in physical register 492*g*, resulting in a zero-cycle load operation.

It is noted that the system of FIG. 4 is merely an example. The block diagram is simplified for clarity. In various embodiments, system 400 may include additional circuits, such as a memory controller circuit, an instruction buffer circuit, and the like.

Figure 5:
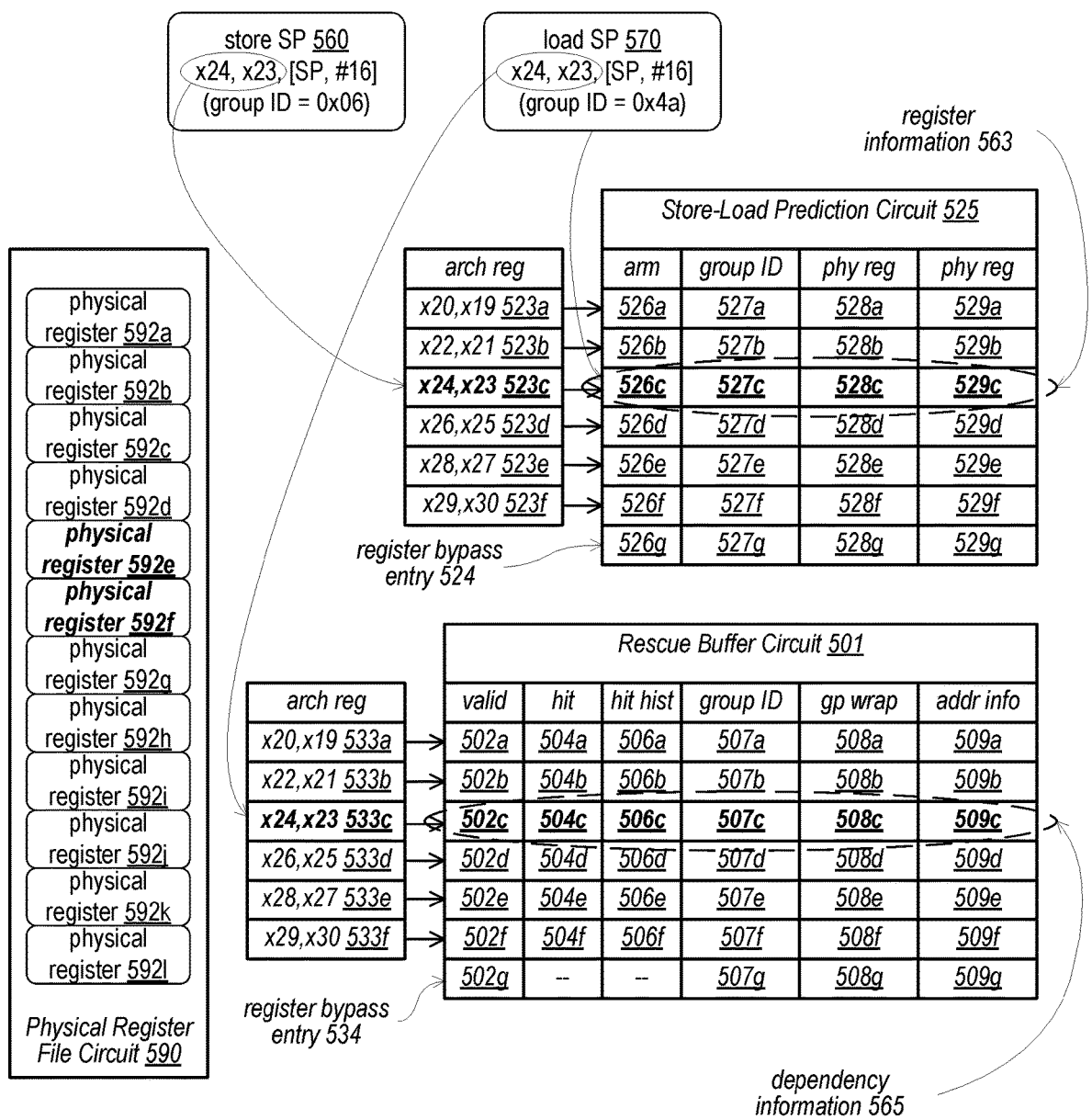
FIG. 5 shows a block diagram of a depiction of information stored in a store-load prediction circuit as well as a rescue buffer circuit.

The embodiments depicted in FIGS. 1-4 disclose creating entries using address information and register information related to a particular store instruction. Various forms of information related to a given store instruction may be included in such entries. FIG. 5 illustrates examples of information held in a store-load prediction circuit and a rescue buffer circuit.

Moving now to FIG. 5, a block diagram of an embodiment of a processor core with a store-load prediction circuit and a rescue buffer circuit is shown. Processor core 500 includes store-load prediction circuit 525, rescue buffer circuit 501, and physical register file circuit 590. Physical register file circuit 590 includes physical registers 592*a*-592*l* (collectively physical registers 592). Both store-load prediction circuit 525 and rescue buffer circuit 501 are shown with seven entries.

As illustrated rescue buffer circuit 501 and store-load prediction circuit 525 are associated with processor core 500. Processor core 500 uses physical registers 592 in physical register file circuit 590 to hold information associated with various instructions being performed within processor core 500, including, for example, instructions store SP instruction 560 and load SP instruction 570 that push a value to, and pop the value from, a stack memory circuit such as described above.

Store-load prediction circuit 525 includes, as shown, seven entries for tracking store instructions that may have a paired load instruction that is a candidate for a ZCL operation. Each entry includes four fields that indicate respective pieces of information associated with a particular store instruction. Arm 526 is a field that is set to indicate that the corresponding entry is ready to be used in conjunction with a ZCL operation. If a corresponding entry does not have its arm 526 field set, then a load instruction that is paired with the respective store instruction may be ineligible for use with a ZCL operation. Group identification (ID) 527 provides an identifier for the respective store instruction. For example, group ID 527 may indicate a particular fetch group in which the respective store instruction was fetched and/or a particular position for the respective store instruction in an instruction buffer such as instruction buffer circuit 250 in FIG. 2. Physical registers (phy reg) 528 and 529 indicate particular ones of physical registers 592 that are allocated to the respective store instruction. It is noted that the inclusion of two register indicators supports store and load instructions that store or load two registers in a single instructions (e.g., double word instructions).

Of the seven entries, six are linked to respective sets of architectural registers (arch reg). Architectural registers are logical register names used within instructions. As shown, store SP instruction 560 and load SP instruction 570 address a same set of two architectural registers, labeled x24 and x23. Accordingly, store SP instruction 560 stores the two values in registers x24 and x23 to the stack memory circuit in positions that are offset 16 and 15 addresses from an addresses indicated by a stack pointer ("[SP, #16]"). Physical registers may be assigned based on prior instruction execution. For example, previous instructions (logic, integer, floating point, etc.) may generate values that are placed into x24 and x23. Ones of physical registers 592 may be assigned to these prior instructions, resulting in a mapping of physical register 592e to x23 and 592f to x24. Accordingly, to store these values, physical registers 592e and 592f are allocated to store SP instruction 560 when, for example, store SP instruction 560 is decoded and placed into an instruction buffer to await execution.

After store SP instruction 560 is placed into the instruction buffer, an entry in store-load prediction circuit is generated. Since store SP instruction 560 indicates architectural registers x24 and x23, entry 523c is used. Group ID 527c is set to a group ID value assigned to store SP instruction 560, or 0x06 as shown. Phy regs 528c and 529c indicate physical registers 592f and 592e, respectively. Arm 526c may be set once values in physical registers 592e and 592f are accurate for store SP instruction 560. For example, prior instructions that set the values for x24 and x23 may be placed in the instruction buffer along with store SP instruction 560. Until these prior instructions are completed, the values in physical registers 592e and 592f may not reflect values that will be stored by execution of store SP instruction 560. Accordingly, arm 526c remains unset until these prior instructions are performed. It is noted that the information placed into entry 523c may be collectively referred to as register information 563, and may correspond to register information 163, 263, and 363 shown in FIGS. 1-4.

In this example, the prior instructions are eventually performed, arm 526c is set, and store SP instruction 560 is released from the instruction buffer for execution. Store SP 560 is released before load SP instruction 570 is placed in the instruction buffer. In response, entry 533c is generated in rescue buffer circuit 501 to retain address information for store SP instruction 560. Like store-load prediction circuit 525, six of the illustrated entries of rescue buffer circuit 501 are accessed based on respective architectural registers. Entries of rescue buffer circuit 501 include six fields. Valid 502 indicates whether the information in the respective entry is currently valid and available for use. Hit 504 indicates whether a load instruction currently in the instruction buffer hits the respective rescue buffer entry. As used herein, a "hit" refers to a load instruction that accesses a source address that is the same as a destination address of a paired store instruction. In the current example, the destination address of store SP instruction 560 and source address of load SP instruction 570 is represented by the stack memory address indicated by "x24,x23,[SP, #16]" that references a location that is offset sixteen locations form the stack pointer value.

Hit history (hist) 506 preserves a history of successful hits to the respective entry, and may be used to disable the entry if hit history 506 has a value indicative of a low hit rate. Group identification (ID) 507 corresponds to group ID 527 from the entries of store-load prediction circuit 525. Group (gp) wrap 508 indicates a number of times that group ID values for the instruction buffer circuit have wrapped (e.g., rolled over) since the respective entry was created. For example, group ID 507/527 may indicate a position of a respective store instruction in the instruction buffer. A number of instructions (e.g., distance) between a store-load pair may be larger than one fetch group, the instruction buffer may be cleared and reloaded with instructions from a subsequent fetch group between the store and load instructions. One instance of clearing and reloading the instruction buffer may be one wrap. An allowed distance between a store-load pair may permit, for example, one wrap of the instruction buffer. If a second wrap occurs before a paired load instruction is fetched, then a ZCL operation may not be permissible in such embodiments.

As illustrated, address information (addr info) 509 is address information associated with the store instruction. For example, address information 509 may correspond to all or a portion of a physical or virtual address of a destination of the store instruction. The six fields of entry 533c of rescue buffer circuit 501 may collectively be referred to as dependency information 565.

A control circuit (e.g., control circuit 120 or 220 from FIGS. 1-4) may be configured to determine that load SP instruction 570 is paired to store SP instruction 560 by comparing the destination address information (e.g., address information 509) from entries of rescue buffer circuit 501 to a source address of load SP instruction 570. If a hit is identified (entry 533c), then the architectural registers (x24, x23) of entry 533c may be determined and used to identify entry 523c in store-load prediction circuit 525. If arm 526c remains set, then the registers indicated by phy reg 528c and 529c (e.g., physical registers 592f and 592e) are reallocated to load SP instruction 570 and may be used by a subsequent instruction that is a consumer of the result of load SP instruction 570.

In some embodiments, a number of entries in a given rescue buffer circuit may be equal to a number of registers included in a register file of a particular processor core circuit. Although store-load prediction circuit 525 and rescue buffer circuit 501 are shown to have a same number of entries, in other embodiments, the number may be different between the two circuits. For example, in some embodiments, a store-load prediction circuit may have more entries than a corresponding rescue buffer circuit.

As shown, both store-load prediction circuit 525 and rescue buffer circuit 501 include a seventh entry that is not accessed using architectural registers. This seventh entry is dedicated to a register bypass entry. Register bypass entries 524 and 534 may be used for cases in which architectural registers are not indicated in the store-load pair. For example, when a distance between the store-load pair is zero, such as illustrated in FIG. 3.

It is noted that processor core 500 of FIG. 5 is an example for describing the disclosed techniques. The block diagram is simplified for clarity. In other embodiments, processor core 500 may include additional circuits, such as an instruction buffer circuit, a fetch control circuit, an instruction decoder, and the like.

Figure 6B:
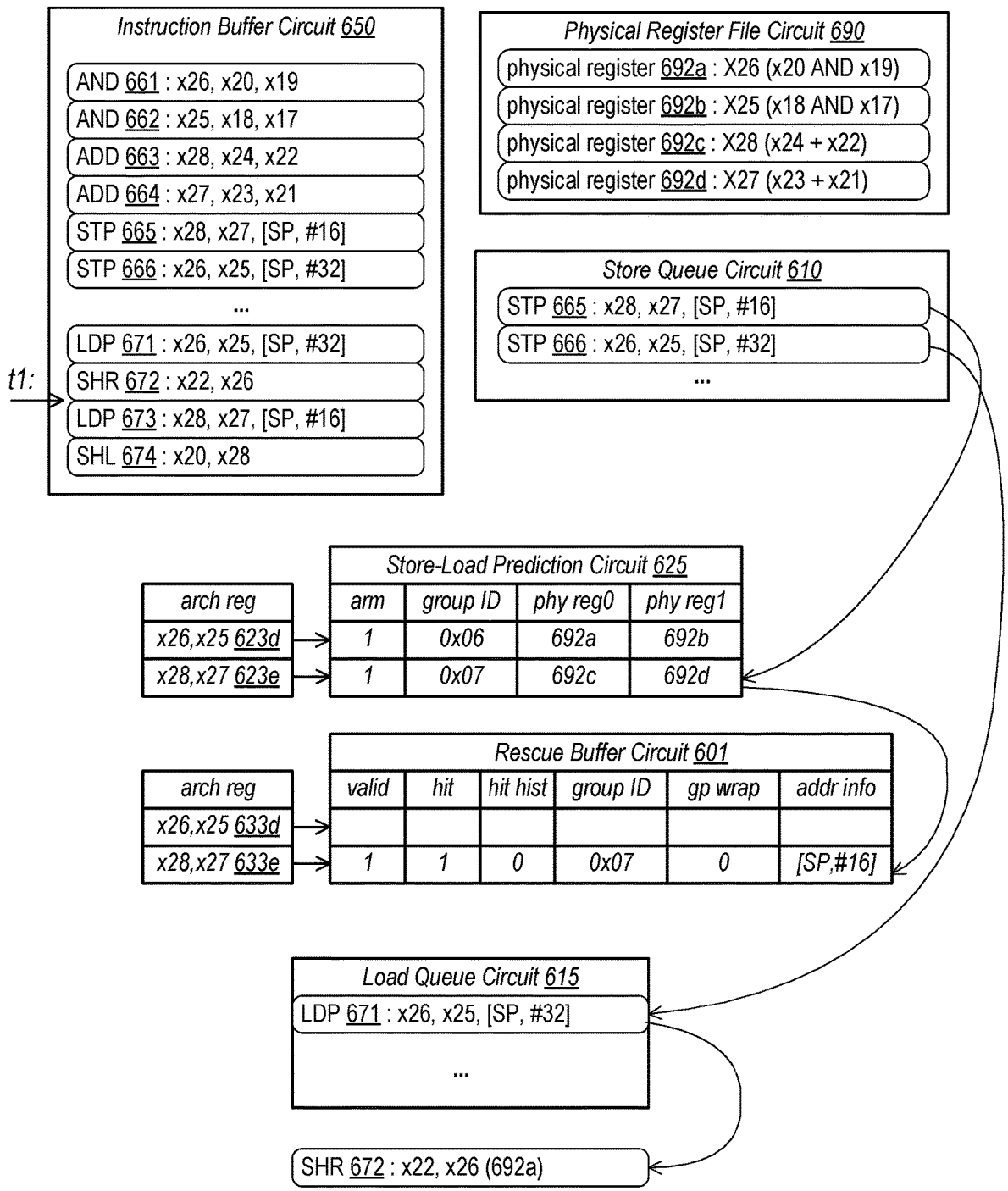
Figure 6C:
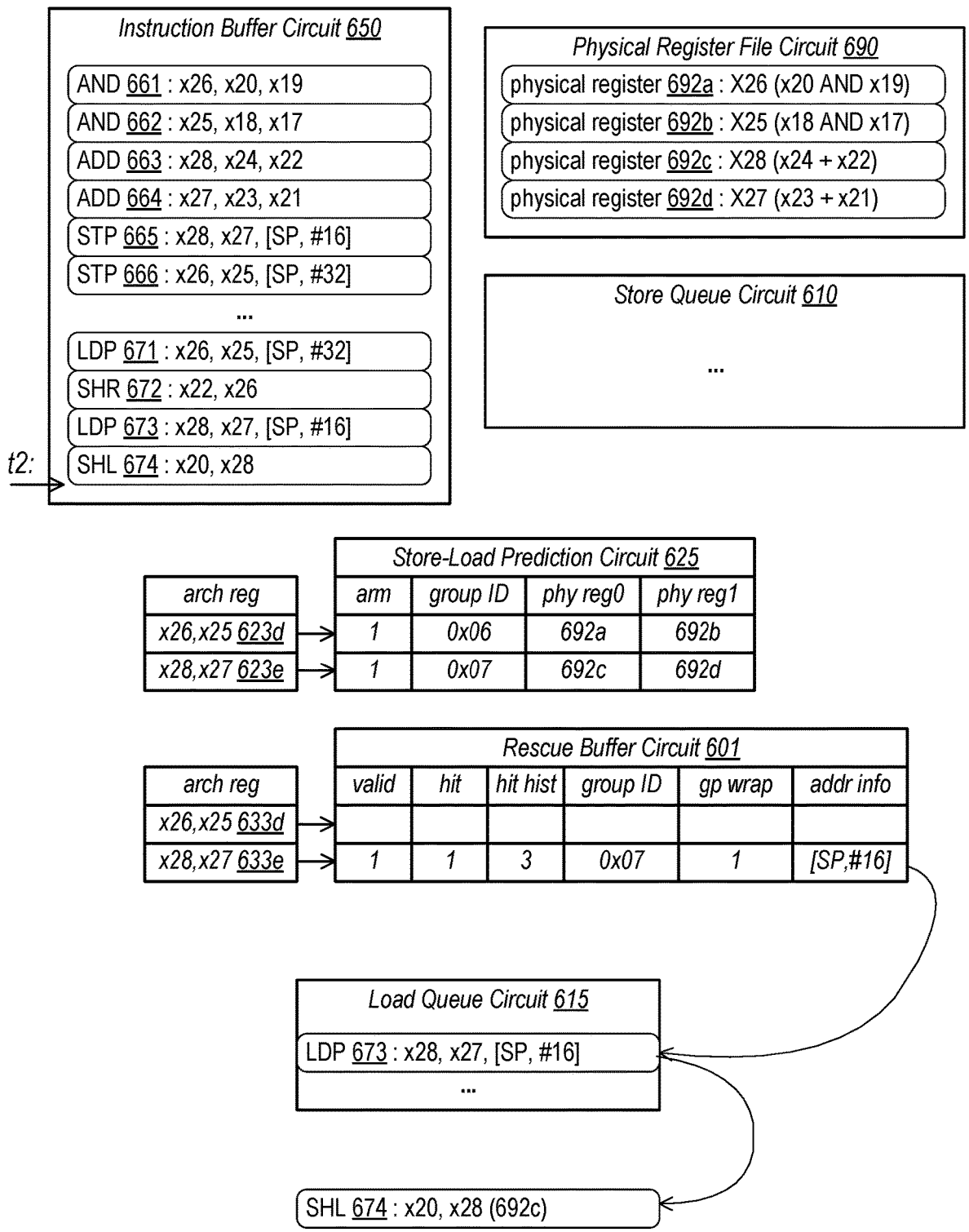

FIGS. 1-5 illustrate various circuits associated with a system that includes a rescue buffer circuit to support use of ZCL operations. Entries in a rescue buffer circuit and in a store-load prediction circuit are described as being generated in response to fetching and performing a store-load pair of instructions. FIGS. 6A-6C depict states of the disclosed circuits at three points in time in response to fetching and performing such a store-load pair.

Proceeding now to FIGS. 6A-6C, a block diagram of an embodiment of a processor core with a store-load prediction circuit and a rescue buffer circuit is shown at three points in time. Processor core 600 includes instruction buffer circuit 650, physical register file circuit 690, store queue circuit 610, store-load prediction circuit 625, rescue buffer circuit 601, and load queue circuit 615. Instruction buffer circuit 650 holds a plurality of instructions, including instructions 661-666 and 671-674.

At time t0, as shown in FIG. 6A, scheduling of instructions 661-666 has occurred. Instructions AND 661, AND 662, ADD 663, and ADD 664 have been performed (e.g., by one of execution circuits 280 of FIGS. 2 and 3). Execution of AND 661 causes values stored in architectural registers x20 and x19 to be logically AND'ed together and the result stored to architectural register x26. Similarly, execution of AND 662 places a result of x18 AND'ed to x17 into x25. Processor core 600 allocates physical registers 692a and 692b to architectural registers x26 and x25, respectively. Execution of ADD 663 causes values stored in architectural registers x24 and x22 to be added together and the sum stored to architectural register x28. In a like manner, execution of ADD 664 places a result of x23 plus x21 into x27. Processor core 600 allocates physical registers 692c and 692d to architectural registers x28 and x27, respectively.

As illustrated, instructions STP 665 and 666 are store instructions that are assigned to a store-load circuit (e.g., store-load circuit 245 in FIGS. 2 and 3). Due to memory access times, the store-load circuit is not able to perform STP 665 and 666 by time t0, and STP 665 and 666 are, therefore, placed in store queue circuit 610 where they will be held until an execution circuit in the store-load circuit (e.g., store-load execution circuit 230) has bandwidth available to execute the store instructions.

STP 665, as shown, is a store instruction for writing values in architectural registers x28 and x27 to a stack memory location determined by a stack pointer value adjusted by an offset of 16. Similarly, STP 666 is a store instruction for writing values in architectural registers x26 and x25 to a stack memory location determined by the stack pointer value adjusted by an offset of 32. The store-load circuit determines that both STP 665 and 666 may be eligible to form respective store-load pairs with subsequent load instructions. Accordingly, a respective entry is generated in store-load prediction circuit 625 for each of STP 665 and STP 666. Based on the indicated architectural registers, register information for STP 665 is stored in entry 623d and register information for STP 666 is stored in entry 623e. Respective group ID values are determined based on the two STP instructions positions within instruction buffer circuit 650. Since the preceding instructions 661-664 have been executed and their results placed physical registers 692a-692d, the allocated registers have valid values and the arm fields of both entries 623d and 623e are set. As illustrated, no entries are created in rescue buffer circuit 601 for either of STP 665 or 666 since both instructions, at time t0, remain in store queue circuit 610.

At time t1, as shown in FIG. 6B, instructions subsequent to STP 666 are assigned, up to and including LDP 671. LDP 671 is a load instruction that reads a value from the stack memory at a location that is the same as STP 666. Accordingly, the store-load circuit determines that LDP 671 forms a store-load pair with STP 666 and enables a ZCL operation to fulfill LDP 671. Since STP 666 is still in store queue circuit 610, no entry may be created in rescue buffer circuit 601 for STP 666. The store-load circuit uses the architectural registers indicated by STP 666 to access entry 623d in store-load prediction circuit 625 and retrieve physical register information for STP 666. The physical registers may be reallocated to LDP 671 and/or to a consumer instruction of the result of LDP 671. For example, SHR 672 uses x26 as an operand. The store-load circuit may, therefore, reallocate physical register 692a directly to SHR 672.

By time t1, the store-load circuit may have bandwidth to perform STP 665. Store queue circuit 610 may, therefore, release STP 665 for execution. In response to this release and a determination that a load instruction has not yet been identified to pair with STP 665, entry 633e in rescue buffer circuit 601 is created to hold dependency information related to STP 665. Relevant values are stored in entry 633e, including address information indicating that STP 665 had a destination address determined by the stack pointer adjusted by an offset of 16.

By time t2, as depicted in FIG. 6C, instructions LDP 673 and SHL 674 are assigned. LDP 673 is a load instruction that reads from the same stack memory location as STP 665. Since STP 665 has been released from store queue circuit 610 by the time LDP 673 is assigned to the store-load circuit, store queue circuit 610 cannot be used to identify the store-load pair of STP 665 and LDP 673. Since, however, dependency information for STP 665 is stored in entry 633e of rescue buffer circuit 601, this store-load pair may still be identified. The store-load circuit uses the architectural registers indicated by LDP 673 to access rescue buffer circuit 601. The address information included in entry 633e matches the source address information included in LDP 673 (SP, #16), thereby indicating that STP 665 and LDP 671 are a store-load pair and enabling use of a ZCL operation to fulfill LDP 673. The architectural registers (x28,x27) are used to access store-load prediction circuit 625 and the physical registers that were allocated to STP 665 are identified and may be reallocated to LDP 673 and/or to subsequent consumer instructions of LDP 671, such as SHL 674 that consumes the value of architectural register x28 which is mapped to physical register 692c.

As disclosed above, use of a rescue buffer circuit may increase a usability of ZCL operations in a processor core. For example, some processor cores may have store instruction pipelines that are shorter than other processor cores. Since a shorter pipeline may result in store instructions being performed in fewer core clock cycles, an opportunity to make use of ZCL operations may be reduced. By retaining dependency information, such as address information, in a rescue buffer circuit after the associated store instruction has been released from a store queue circuit, ZCL operations may be used for more instances of store-load pairs.

It is noted that the example illustrated across FIGS. 6A-6C is merely a demonstration of the disclosed techniques. The illustrated block diagrams are simplified for clarity and focus. In other embodiments, additional blocks may be included, such as various execution circuits, a store-load circuit, a stack memory circuit, and the like.

To summarize, various embodiments of a system that includes a rescue buffer circuit are disclosed. Broadly speaking, apparatus, systems, and methods are contemplated in which an embodiment of an apparatus, for example, includes a rescue buffer circuit, a store queue circuit, and a control circuit. The rescue buffer circuit may be configured to retain address information related to store instructions. The store queue circuit may be configured to buffer dependency information related to a particular store instruction until the particular store instruction is released to be executed. The control circuit may be configured to cause a subset of the dependency information for the particular store instruction to be written to the rescue buffer circuit. The rescue buffer circuit may be configured to retain the subset after the dependency information has been released from the store queue circuit, and to perform a subsequent load instruction corresponding to a memory location associated with the particular store instruction using the subset of the dependency information from the rescue buffer circuit.

In a further example, the subset of dependency information may include address information for a destination of the particular store instruction and an identification value for the particular store instruction. In another example, the control circuit may be further configured to determine that the particular store instruction satisfies a set of requirements for use in the rescue buffer circuit in order to cause the dependency information to be written to the rescue buffer circuit.

In one example, a requirement of the set of requirements may be that the particular store instruction is a store to a stack memory. In such an example, the control circuit may also be configured to determine that the subsequent load instruction is a load from the stack memory in order to use the dependency information from the rescue buffer circuit.

In another example, a requirement of the set of requirements may be that the particular store instruction is adjacent to the subsequent load instruction. In an embodiment, the control circuit may be further configured, in response to a determination that the particular store instruction is being released from the store queue circuit, to cause the dependency information to be written to the rescue buffer circuit.

In a further example, the rescue buffer circuit may be associated with a particular core circuit. A number of entries in the rescue buffer circuit may be equal to a number of physical registers included in the particular core circuit.

The circuits and techniques described above in regards to FIGS. 1-6 may be performed using a variety of methods. One such method for using a rescue buffer circuit is described below in regards to FIG. 7.

Turning now to FIG. 7, a flow diagram for an embodiment of a method for using a return prediction circuit in a processor core is illustrated. Method 700 may be used in conjunction with any of the computer circuitry, systems, devices, elements, or components disclosed herein, such as systems 100 and 400, processor cores 200, 500 and 600, and others. Method 700 is described below using system 100 of FIG. 1 as an example. References to elements in FIG. 1 are included as non-limiting examples.

As illustrated, method 700 begins in block 710 by buffering, into a store queue circuit, a particular store instruction and dependency information that is related to the particular store instruction. In FIG. 1, for example, stack push instruction 160 is buffered in store queue circuit 110. The entry in store queue circuit 110 may include information that can be used to determine if a subsequent load instruction is dependent on stack push instruction 160. Such dependency information may include address and/or architectural register information. In some embodiments, the dependency information is part of the instruction. In addition to placing stack push instruction 160 into store queue circuit 110, register information 163 is stored in an entry in store-load prediction circuit 140. This register information may include indications of a mapping of architectural registers indicated by stack push instruction 160 to physical register circuits included in system 100 (e.g., physical registers 492 in FIGS. 4-6C).

Method 700 continues in block 720 by releasing, from the store queue circuit for execution, the particular store instruction and the related dependency information. As shown in FIG. 1, for example, stack push instruction 160 is released for execution into store-load execution circuit 130. Dependency information associated with stack push instruction 160 is also released, such that store queue circuit 110 may retain no information associated with stack push instruction 160, thereby making the entry used by stack push instruction 160 available for a next store instruction.

In some embodiments, method 700 also includes allocating a particular physical register to stack push instruction 160 prior to executing the particular store instruction. In various embodiments, the particular physical register may be assigned to stack push instruction 160 when stack push instruction 160 is placed into store queue circuit 110, after placement in store queue circuit 110 but before being released, or in response to being released from store queue circuit 110. An indication of the particular physical register may be included in register information 163 that is stored in store-load prediction circuit 140.

In response to the releasing, method 700 continues in block 730 by storing, in a rescue buffer circuit, a subset of the dependency information for the particular store instruction. For example, address information 165 is placed in rescue buffer circuit 101. The subset of dependency information may include address information 165 that indicates a destination address of stack push instruction 160 in addition to an identification value for stack push instruction 160. Since instruction 160 is a stack push, the address information may indicate an address within stack memory circuit 150.

In some embodiments, storing address information 165 in rescue buffer circuit 101 may be performed in response to determining that stack push instruction 160 satisfies one or more requirements associated with use of rescue buffer circuit 101. Use of rescue buffer circuit 101 may be limited, in some embodiments, to store instructions that have a higher likelihood of having a paired load instruction that may be performed using a ZCL operation. For example, one of the one or more requirements may be that stack push instruction 160 is a store to stack memory circuit 150. Another example of one of the one or more requirements may be that a particular store instruction is adjacent to a subsequent load instruction, such as store instruction 360 and load instruction 370 in FIG. 3.

At block 740, method 700 continues by identifying a subsequent load instruction that corresponds to a memory location associated with the particular store instruction. For example, after stack pop instruction 170 has been received, address information 165 may be compared to address information included in stack pop instruction 170. In response to the respective address information matching, stack pop instruction 170 is identified as part of a store-load pair with stack push instruction 160. In such a case, stack push instruction 160 writes data to a memory location from which stack pop instruction 170 reads data. Accordingly, a ZCL operation may be performed to fulfill stack pop instruction 170.

After the particular store instruction is released, method 700 continues in block 750 by performing, using the dependency information from the rescue buffer circuit, the subsequent load instruction. As shown in FIG. 1, address information 165 may include information to identify register information 163 in store-load prediction circuit 140. Register information 163, in turn, includes an indication of a particular physical register used to hold a value to be written to the destination address in stack memory circuit 150. Accordingly, the value to be read by stack pop instruction 170 is held in the particular physical register. Performing stack pop instruction 170 may, therefore, be done using the particular physical register.

Using the particular physical register to perform stack pop instruction 170 may avoid a memory access request from being sent to stack memory circuit 150, thereby freeing bandwidth for stack memory circuit 150 and any intervening interfaces, memory controllers, buses, and the like. In some cases, performing stack pop instruction 170 using a ZCL operation may include reallocating the particular register to a subsequent instruction that is a consumer of the result of stack pop instruction 170. Accordingly, in addition to freeing bandwidth from memory circuits, use of the ZCL operation may also reduce an execution time for completing stack pop instruction 170 and, therefore, an execution time of the consumer instruction.

It is noted that the method of FIG. 7 includes elements 710-750. Method 700 may end in block 750 or may repeat some or all blocks of the method. For example, method 700 may return to block 710 in response to buffering a subsequent store instruction. In some cases, method 700 may be performed concurrently with other instantiations of the method. For example, some programs may include a plurality of store instructions that are buffered before a corresponding paired load instruction is buffered. In such a case, additional instantiations of method 700 may be performed, for example, between blocks 710 and 740 of a first instantiation.

Figure 8:
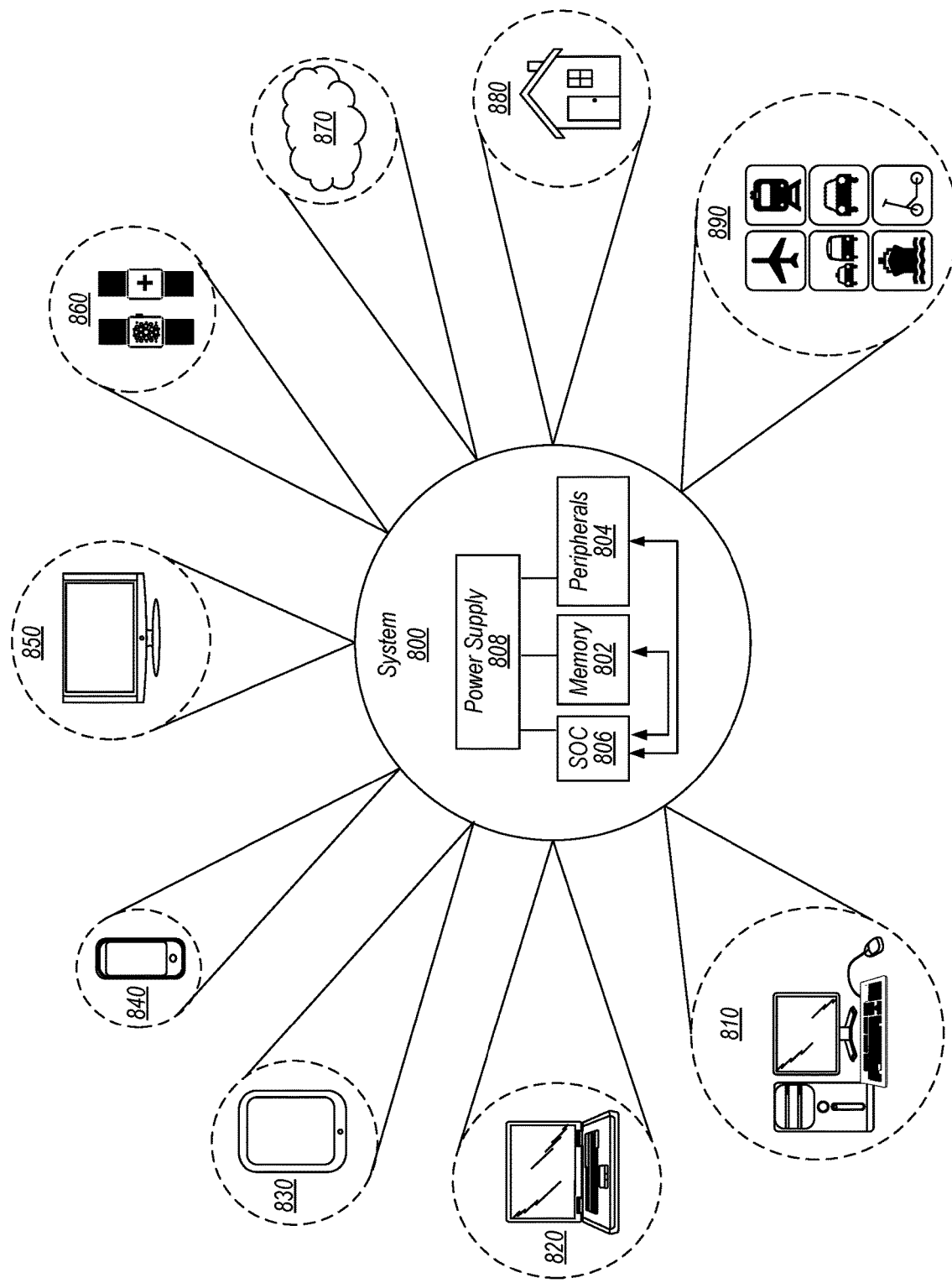
FIG. 8 illustrates various embodiments of systems that include integrated circuits that utilize the disclosed techniques.

FIGS. 1-7 illustrate circuits and methods for a system, such as an integrated circuit, that includes a return prediction circuit and/or a sequential prediction circuit. Any embodiment of the disclosed systems may be included in one or more of a variety of computer systems, such as a desktop computer, laptop computer, smartphone, tablet, wearable device, and the like. In some embodiments, the circuits described above may be implemented on a system-on-chip (SoC) or other type of integrated circuit. A block diagram illustrating an embodiment of computer system 800 is illustrated in FIG. 8. Computer system 800 may, in some embodiments, include any disclosed embodiment of systems 100 and 400, and/or processor cores 200, 500, and 600.

In the illustrated embodiment, the system 800 includes at least one instance of a system on chip (SoC) 806 which may include multiple types of processor circuits, such as a central processing unit (CPU), a graphics processing unit (GPU), or otherwise, a communication fabric, and interfaces to memories and input/output devices. One or more of these processor circuits may correspond to an instance of the processor cores disclosed herein. In various embodiments, SoC 806 is coupled to external memory circuit 802, peripherals 804, and power supply 808.

A power supply 808 is also provided which supplies the supply voltages to SoC 806 as well as one or more supply voltages to external memory circuit 802 and/or the peripherals 804. In various embodiments, power supply 808 represents a battery (e.g., a rechargeable battery in a smart phone, laptop or tablet computer, or other device). In some embodiments, more than one instance of SoC 806 is included (and more than one external memory circuit 802 is included as well).

External memory circuit 802 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. In some embodiments, external memory circuit 802 may include non-volatile memory such as flash memory, ferroelectric random-access memory (FRAM), or magnetoresistive RAM (MRAM). One or more memory devices may be coupled onto a circuit board to form memory modules such as single inline memory modules (SIMMs), dual inline memory modules (DIMMs), etc. Alternatively, the devices may be mounted with a SoC or an integrated circuit in a chip-on-chip configuration, a package-on-package configuration, or a multi-chip module configuration.

The peripherals 804 include any desired circuitry, depending on the type of system 800. For example, in one embodiment, peripherals 804 includes devices for various types of wireless communication, such as Wi-Fi, Bluetooth, cellular, global positioning system, etc. In some embodiments, the peripherals 804 also include additional storage, including RAM storage, solid state storage, or disk storage. The peripherals 804 include user interface devices such as a display screen, including touch display screens or multi-touch display screens, keyboard or other input devices, microphones, speakers, etc.

As illustrated, system 800 is shown to have application in a wide range of areas. For example, system 800 may be utilized as part of the chips, circuitry, components, etc., of a desktop computer 810, laptop computer 820, tablet computer 830, cellular or mobile phone 840, or television 850 (or set-top box coupled to a television). Also illustrated is a smartwatch and health monitoring device 860. In some embodiments, the smartwatch may include a variety of general-purpose computing related functions. For example, the smartwatch may provide access to email, cellphone service, a user calendar, and so on. In various embodiments, a health monitoring device may be a dedicated medical device or otherwise include dedicated health related functionality. In various embodiments, the above-mentioned smartwatch may or may not include some or any health monitoring related functions. Other wearable devices 860 are contemplated as well, such as devices worn around the neck, devices attached to hats or other headgear, devices that are implantable in the human body, eyeglasses designed to provide an augmented and/or virtual reality experience, and so on.

System 800 may further be used as part of a cloud-based service(s) 870. For example, the previously mentioned devices, and/or other devices, may access computing resources in the cloud (i.e., remotely located hardware and/or software resources). Still further, system 800 may be utilized in one or more devices of a home 880 other than those previously mentioned. For example, appliances within the home may monitor and detect conditions that warrant attention. Various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 8 is the application of system 800 to various modes of transportation 890. For example, system 800 may be used in the control and/or entertainment systems of aircraft, trains, buses, cars for hire, private automobiles, waterborne vessels from private boats to cruise liners, scooters (for rent or owned), and so on. In various cases, system 800 may be used to provide automated guidance (e.g., self-driving vehicles), general systems control, and otherwise.

It is noted that the wide variety of potential applications for system 800 may include a variety of performance, cost, and power consumption requirements. Accordingly, a scalable solution enabling use of one or more integrated circuits to provide a suitable combination of performance, cost, and power consumption may be beneficial. These and many other embodiments are possible and are contemplated. It is noted that the devices and applications illustrated in FIG. 8 are illustrative only and are not intended to be limiting. Other devices are possible and are contemplated.

As disclosed in regards to FIG. 8, computer system 800 may include one or more integrated circuits included within a personal computer, smart phone, tablet computer, or other type of computing device. A process for designing and producing an integrated circuit using design information is presented below in FIG. 9.

Figure 9:
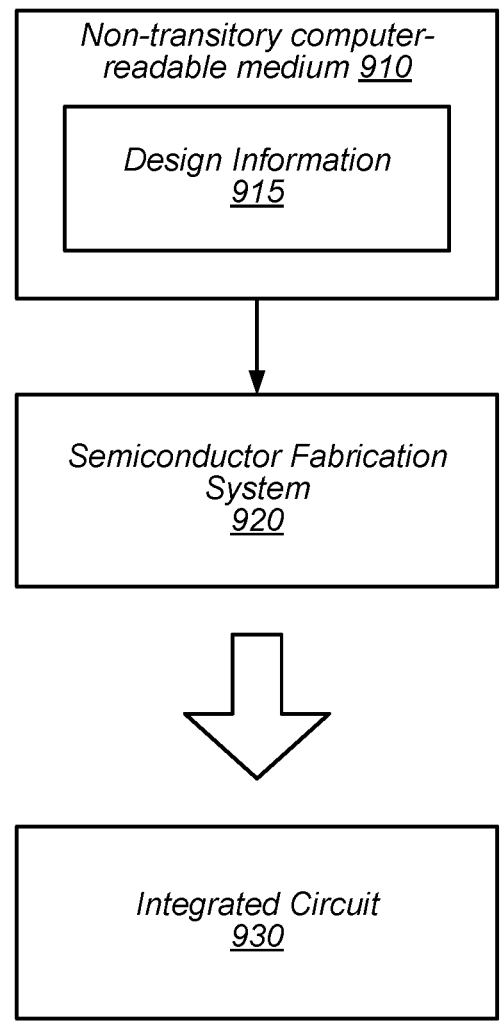
FIG. 9 is a block diagram of an example computer-readable medium, according to some embodiments.

FIG. 9 is a block diagram illustrating an example of a non-transitory computer-readable storage medium that stores circuit design information, according to some embodiments. The embodiment of FIG. 9 may be utilized in a process to design and manufacture integrated circuits, for example, systems including one or more instances of systems 100 and 400, and/or processor cores 200, 500, and 600 shown in FIGS. 1-6C. In the illustrated embodiment, semiconductor fabrication system 920 is configured to process the design information 915 stored on non-transitory computer-readable storage medium 910 and fabricate integrated circuit 930 based on the design information 915.

Non-transitory computer-readable storage medium 910, may comprise any of various appropriate types of memory devices or storage devices. Non-transitory computer-readable storage medium 910 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 910 may include other types of non-transitory memory as well or combinations thereof. Non-transitory computer-readable storage medium 910 may include two or more memory mediums which may reside in different locations, e.g., in different computer systems that are connected over a network.

Design information 915 may be specified using any of various appropriate computer languages, including hardware description languages such as, without limitation: VHDL, Verilog, SystemC, SystemVerilog, RHDL, M, MyHDL, etc. Design information 915 may be usable by semiconductor fabrication system 920 to fabricate at least a portion of integrated circuit 930. The format of design information 915 may be recognized by at least one semiconductor fabrication system, such as semiconductor fabrication system 920, for example. In some embodiments, design information 915 may include a netlist that specifies elements of a cell library, as well as their connectivity. One or more cell libraries used during logic synthesis of circuits included in integrated circuit 930 may also be included in design information 915. Such cell libraries may include information indicative of device or transistor level netlists, mask design data, characterization data, and the like, of cells included in the cell library.

Integrated circuit 930 may, in various embodiments, include one or more custom macrocells, such as memories, analog or mixed-signal circuits, and the like. In such cases, design information 915 may include information related to included macrocells. Such information may include, without limitation, schematics capture database, mask design data, behavioral models, and device or transistor level netlists. As used herein, mask design data may be formatted according to graphic data system (gdsii), or any other suitable format.

Semiconductor fabrication system 920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 920 may also be configured to perform various testing of fabricated circuits for correct operation.

In various embodiments, integrated circuit 930 is configured to operate according to a circuit design specified by design information 915, which may include performing any of the functionality described herein. For example, integrated circuit 930 may include any of various elements shown or described herein. Further, integrated circuit 930 may be configured to perform various functions described herein in conjunction with other components.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

\* \* \*

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:
1. A system, comprising:
   a stack memory circuit;
   a rescue buffer circuit configured to retain address information related to stack push instructions;
   a store-load prediction circuit configured to retain register information related to stack push instructions;
   a store-load execution circuit configured to execute stack push and stack pop instructions using the stack memory circuit;
   a store queue circuit configured to buffer a particular stack push instruction until the particular stack push instruction is released in response to selection by the store-load execution circuit; and
   a control circuit configured to:

cause register information related to the particular stack push instruction to be written to the store-load prediction circuit;

cause address information related to the particular stack push instruction to be written to the rescue buffer circuit, wherein the rescue buffer circuit is further configured to retain the address information after the particular stack push instruction has been released from the store queue circuit;

identify, using the address information in the rescue buffer circuit, a subsequent stack pop instruction that is related to the particular stack push instruction; and perform the subsequent stack pop instruction using the register information from the store-load prediction circuit.

2. The system of claim 1, wherein the address information includes destination address information for the particular stack push instruction and an identification value for the particular stack push instruction.

3. The system of claim 2, wherein the control circuit is further configured to determine that the subsequent stack pop instruction is related to the particular stack push instruction by comparing the destination address information from the rescue buffer circuit to source address information of the subsequent stack pop instruction.

4. The system of claim 1, wherein the control circuit is further configured to determine that the subsequent stack pop instruction is separated from the particular stack push instruction by less than a threshold number of instructions in order to use the register information from the store-load prediction circuit.

5. The system of claim 1, further comprising a plurality of physical registers; and
wherein the control circuit is further configured to reassign a particular physical register assigned to the particular stack push instruction to a consumer instruction that uses information from the subsequent stack pop instruction.

6. The system of claim 1, wherein the control circuit is further configured, in response to a determination that the particular stack push instruction is being released from the store queue circuit, to cause the address information related to the particular stack push instruction to be written to the rescue buffer circuit.

7. A method, comprising:
buffering, into a store queue circuit, a particular store instruction and dependency information that is related to the particular store instruction;

releasing, from the store queue circuit for execution, the particular store instruction and the related dependency information;

in response to the releasing, storing, in a rescue buffer circuit, a subset of the dependency information for the particular store instruction;

identifying a subsequent load instruction that corresponds to a memory location associated with the particular store instruction; and after the particular store instruction is released, performing, using the dependency information from the rescue buffer circuit, the subsequent load instruction.

8. The method of claim 7, wherein the subset of the dependency information includes address information for a destination of the particular store instruction and an identification value for the particular store instruction.

9. The method of claim 7, further comprising storing the subset of the dependency information in the rescue buffer circuit in response to determining that the particular store instruction satisfies one or more requirements associated with use of the rescue buffer circuit.

10. The method of claim 9, wherein one of the one or more requirements is that the particular store instruction is a store to a stack memory.

11. The method of claim 9, wherein one of the one or more requirements is that the particular store instruction is adjacent to the subsequent load instruction.

12. The method of claim 7, further comprising:
allocating a particular physical register to the particular store instruction prior to executing the particular store instruction; and
performing the subsequent load instruction using the particular physical register.

13. An apparatus comprising:
a rescue buffer circuit configured to retain dependency information related to store instructions;
a store queue circuit configured to buffer dependency information related to a particular store instruction until the particular store instruction is released to be executed; and
a control circuit configured to:
cause a subset of the dependency information for the particular store instruction to be written to the rescue buffer circuit, wherein the rescue buffer circuit is configured to retain the subset after the dependency information has been released from the store queue circuit; and
perform a subsequent load instruction corresponding to a memory location associated with the particular store instruction using the subset of the dependency information from the rescue buffer circuit.

14. The apparatus of claim 13, wherein the subset of the dependency information includes address information for a destination of the particular store instruction and an identification value for the particular store instruction.

15. The apparatus of claim 13, wherein the control circuit is further configured to determine that the particular store instruction satisfies a set of requirements for use in the rescue buffer circuit in order to cause the dependency information to be written to the rescue buffer circuit.

16. The apparatus of claim 15, wherein a requirement of the set of requirements is that the particular store instruction is a store to a stack memory.

17. The apparatus of claim 16, wherein the control circuit is further configured to determine that the subsequent load instruction is a load from the stack memory in order to use the dependency information from the rescue buffer circuit.

18. The apparatus of claim 15, wherein a requirement of the set of requirements is that the particular store instruction is adjacent to the subsequent load instruction.

19. The apparatus of claim 13, wherein the control circuit is further configured, in response to a determination that the particular store instruction is being released from the store queue circuit, to cause the dependency information to be written to the rescue buffer circuit.

20. The apparatus of claim 13, wherein the rescue buffer circuit is associated with a particular core circuit, and wherein a number of entries in the rescue buffer circuit is equal to a number of physical registers included in the particular core circuit.

* * * * *